US012766800B2

(12) United States Patent
Komaniwa

(10) Patent No.: US 12,766,800 B2
(45) Date of Patent: Oct. 20, 2026

(54) METHOD OF PRODUCING PREFORM AND METHOD OF MOLDING COMPOSITE MATERIAL

(71) Applicant: SUBARU CORPORATION, Tokyo (JP)

(72) Inventor: Masami Komaniwa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 78 days.

(21) Appl. No.: 18/457,180

(22) Filed: Aug. 28, 2023

(65) Prior Publication Data

US 2024/0100787 A1 Mar. 28, 2024

(30) Foreign Application Priority Data

Sep. 26, 2022 (JP) ................................ 2022-153127

(51) Int. Cl.

| | |
|---|---|
| ***B29C 70/48*** | (2006.01) |
| ***B29C 70/06*** | (2006.01) |
| ***B29C 70/38*** | (2006.01) |
| ***B29C 70/50*** | (2006.01) |
| *B29K 105/08* | (2006.01) |

(Continued)

(52) U.S. Cl.

CPC .............. *B29C 70/48* (2013.01); *B29C 70/06* (2013.01); *B29C 70/388* (2013.01); *B29C 70/504* (2013.01); *B29K 2105/0872* (2013.01); *B29K 2307/04* (2013.01); *B29K 2309/08* (2013.01)

(58) Field of Classification Search

CPC ... B29C 70/386; B29C 70/388; B29C 43/136; B29C 43/203; B29C 70/34; B29C 70/382; B29C 70/384

See application file for complete search history.

(56) References Cited

U.S. PATENT DOCUMENTS

| | | | |
|---|---|---|---|
| 8,986,482 | B2 | 3/2015 | McCowin et al. |
| 9,248,591 | B2 | 2/2016 | Caffiau et al. |

(Continued)

FOREIGN PATENT DOCUMENTS

| | | | |
|---|---|---|---|
| DE | 20 2014 100 515 | U1 | 3/2015 |
| EP | 3 967 479 | A1 | 3/2022 |

(Continued)

OTHER PUBLICATIONS

Extended European Search Report mailed Mar. 11, 2024 for European Patent Application No. 23195007.2 (6 pages).

(Continued)

*Primary Examiner* — Matthew J Daniels

(74) *Attorney, Agent, or Firm* — Smith, Gambrell & Russell, LLP

(57) ABSTRACT

A method of producing a preform includes: laminating first prepreg tapes with at least one interval in a width direction of the first prepreg tapes using an automated fiber placement apparatus configured to allow disposing desired prepreg tapes, supplied from bobbins, in a width direction of the desired prepreg tapes, and feeding out the disposed desired prepreg tapes in a length direction of the disposed desired prepreg tapes; and laminating at least one second prepreg tape in the at least one interval between the laminated first prepreg tapes, using the automated fiber placement apparatus. The preform is a material for a fiber reinforced plastic.

20 Claims, 10 Drawing Sheets

(51) Int. Cl.
*B29K 307/04* (2006.01)
*B29K 309/08* (2006.01)

(56) References Cited

U.S. PATENT DOCUMENTS

| | | | |
|---|---|---|---|
| 11,529,773 B2 | 12/2022 | Takagi et al. | |
| 11,548,241 B2 | 1/2023 | Yasukochi et al. | |
| 11,597,168 B2 | 3/2023 | Kawabe et al. | |
| 11,679,570 B2 | 6/2023 | Hirabayashi et al. | |
| 2006/0073311 A1* | 4/2006 | Hogg | B29C 70/545 428/174 |
| 2009/0301648 A1* | 12/2009 | Hogg | B29C 70/386 156/230 |
| 2012/0141288 A1* | 6/2012 | Gaffiero | B29C 70/202 428/113 |
| 2013/0074663 A1* | 3/2013 | Pedigo | B29C 70/384 83/13 |
| 2015/0099091 A1* | 4/2015 | Kurtz | B29D 99/001 428/114 |
| 2020/0055263 A1 | 2/2020 | Takagi et al. | |
| 2021/0206122 A1 | 7/2021 | Kawabe et al. | |
| 2022/0072813 A1 | 3/2022 | Hirabayashi et al. | |
| 2022/0266545 A1 | 8/2022 | Hirabayashi et al. | |

FOREIGN PATENT DOCUMENTS

| | | | |
|---|---|---|---|
| JP | 2011527648 A * | 11/2011 | B29C 70/06 |
| JP | 2014-519995 A | 8/2014 | |
| JP | 2019-151726 A | 9/2019 | |
| JP | 2020-059144 A | 4/2020 | |
| JP | 2020-059145 A | 4/2020 | |
| JP | 2020-093454 A | 6/2020 | |
| JP | 2022-046379 A | 3/2022 | |
| JP | 2022130133 A * | 9/2022 | B29C 70/388 |
| WO | 2018/168202 A1 | 9/2018 | |

OTHER PUBLICATIONS

Notice of Reasons for Refusal mailed Jun. 24, 2026 for Japanese Patent Application No. 2022-153127 (5 pages in Japanese; 7 pages English translation).

* cited by examiner

METHOD OF PRODUCING PREFORM AND METHOD OF MOLDING COMPOSITE MATERIAL

CROSS REFERENCES TO RELATED APPLICATIONS

This application is based upon and claims the benefit of priority from Japanese Patent Application No. 2022-153127, filed on Sep. 26, 2022; the entire contents of which are incorporated herein by reference.

FIELD

Implementations described herein relate generally to a method of producing a preform and a method of molding a composite material.

BACKGROUND

In order to mold an FRP (fiber reinforced plastic), such as a GFRP (glass fiber reinforced plastic) or a CFRP (carbon fiber reinforced plastic), which is also referred to as a composite material, it is necessary to laminate prepreg sheets consisting of fiber sheets impregnated with uncured resin, and subsequently cure the resin. Alternatively, it is necessary to laminate fiber sheets which have not been impregnated with resin, and subsequently impregnate the laminated fiber sheets with the resin and cure the resin. The method of molding an FRP of impregnating fibers with resin after laminating the fibers is referred to as an RTM (Resin Transfer Molding) method.

In recent years, an AFP (Automated Fiber Placement) apparatus for automatically laminating prepreg tapes or fiber tapes is commercially available (for example, refer to Japanese Patent Application Publication JP2014-519995A, International Publication WO2018/168202A and Japanese Patent Application Publication JP2019-151726A), and therefore a prepreg tape as well as a fiber tape, which has not been impregnated with resin, called a dry tape is also commercially available for lamination with an AFP apparatus.

When tape materials, such as prepreg tapes or dry tapes, are laminated with an AFP apparatus, laminating the tape materials simultaneously can improve the lamination efficiency, i.e., the length of the tape material laminated per unit time. Accordingly, an AFP apparatus having lamination heads is also devised so that tape materials can be laminated simultaneously (for example, refer to Japanese Patent Application Publication JP2011-527648A and Japanese Patent Application Publication JP2022-130133A). In addition, technique for adjusting an overlapped amount between adjacent prepreg tapes is also suggested for a multi-head type AFP apparatus for laminating prepreg tapes simultaneously (for example, refer to Japanese Patent Application Publication JP2020-059145A and Japanese Patent Application Publication JP2022-046379A).

An object of the present invention is to make it possible to laminate prepreg tapes, which are material of an FRP, along not only a linear path but also a curved path.

SUMMARY OF THE INVENTION

In general, according to one implementation, a method of producing a preform includes: laminating first prepreg tapes with at least one interval in a width direction of the first prepreg tapes using an automated fiber placement apparatus configured to allow disposing desired prepreg tapes, supplied from bobbins, in a width direction of the desired prepreg tapes, and feeding out the disposed desired prepreg tapes in a length direction of the disposed desired prepreg tapes; and laminating at least one second prepreg tape in the at least one interval between the laminated first prepreg tapes, using the automated fiber placement apparatus. The preform is a material for a fiber reinforced plastic.

Further, according to one implementation, a method of molding a composite material includes molding the fiber reinforced plastic as the composite material, using the preform produced by the above-mentioned method.

DETAILED DESCRIPTION

A method of producing a preform and a method of molding a composite material according to implementations of the present invention will be described with reference to accompanying drawings.

(First Implementation)

(A Method of Producing a Preform)

Figure 1:
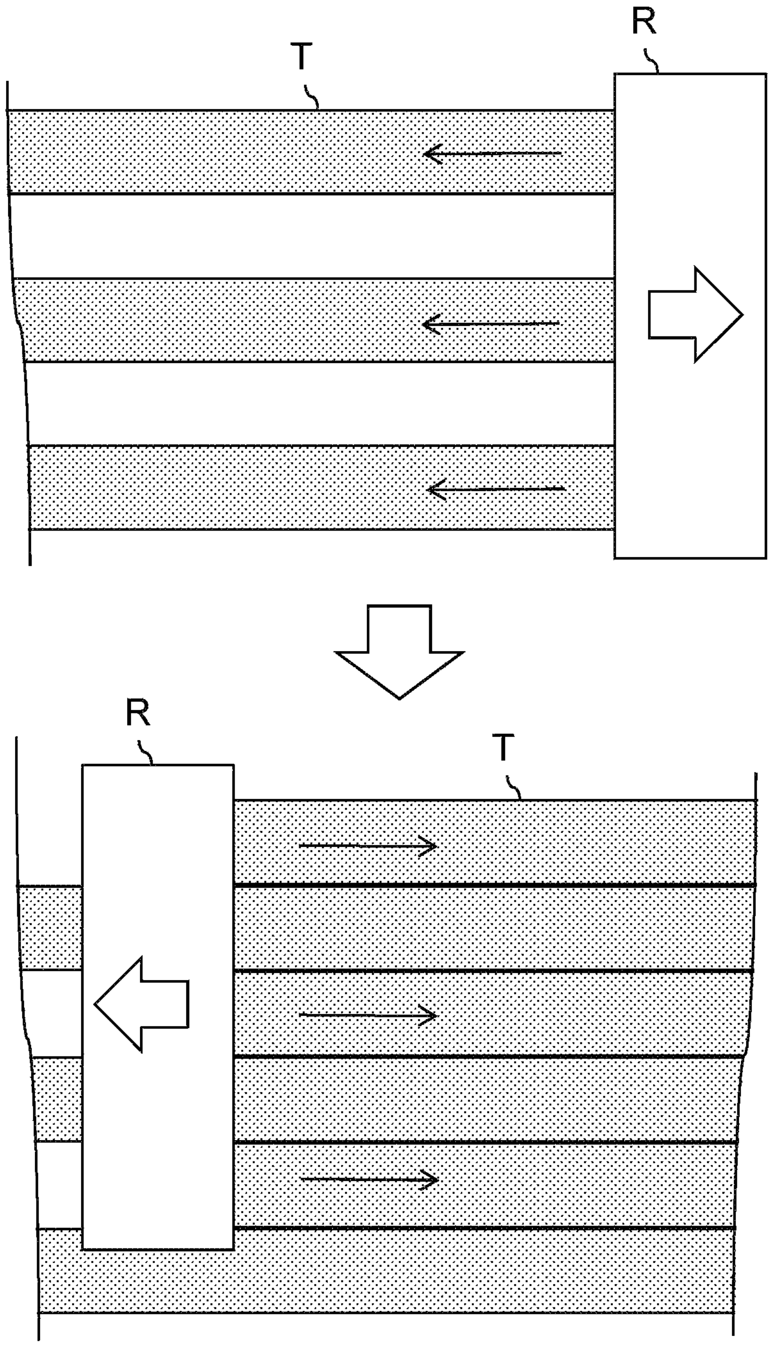
FIG. 1 is a top view of prepreg tapes T for explaining a method of producing a preform according to the first implementation of the present invention.

FIG. 1 is a top view of prepreg tapes T for explaining a method of producing a preform according to the first implementation of the present invention.

Each prepreg tape T is a tape-shaped prepreg which is fibers impregnated with thermoplastic resin or uncured thermosetting resin. A preform can be produced by laminating prepreg tapes T and shaping the laminated prepreg tapes T into a shape that matches the shape of an FRP, such as a CFRP or a GFRP, to be molded. A preform is a laminated body of prepregs, which is a material of an FRP.

Therefore, it is necessary to laminate the prepreg tapes T in order to produce a preform. For this purpose, a lamination jig having a simple shape for laminating the prepreg tapes T and a shaping jig having a complicated shape for shaping the laminated body of the prepreg tapes T can be prepared separately. In this case, the laminated body of the prepreg tapes T laminated on the lamination jig is transferred on the shaping jig for shaping the laminated body of the prepreg tapes T. Alternatively, a lamination jig may also be used as a shaping jig. That is, the prepreg tapes T may be laminated and shaped at the same time, or the prepreg tapes T may be laminated and subsequently shaped.

The lamination of the prepreg tapes T can be performed using an AFP apparatus. A typical AFP apparatus has a compaction roller R for feeding out the prepreg tape T while applying pressure to the prepreg tape T in the thickness direction. Then, the prepreg tape T can be fed out in the direction opposite to a moving direction of a lamination head, to which the compaction roller R is attached, of the AFP apparatus by moving the lamination head relatively to a table and the prepreg tape T already laminated below.

As shown in FIG. 1, a plurality of the prepreg tapes T can be disposed in the width direction and fed out from the compaction roller R in the length direction. For this purpose, what is necessary is to use an AFP apparatus which allows disposing a plurality of the prepreg tapes T in the width direction, feeding out the prepreg tapes T simultaneously in the length direction and applying pressure to the prepreg tapes T with the common compaction roller R. Examples of an AFP apparatus having such a mechanism include the AFP apparatus described in Japanese Patent Application Publication JP2022-046379A, the AFP apparatus described in Japanese Patent Application Publication JP2022-130133A, the AFP apparatus described in the application documents of Japanese Patent Application No. 2022-007499 and the AFP apparatus described in the application documents of Japanese Patent Application No. 2022-013771 in addition to the AFP apparatus described later.

In particular, after laminating the first prepreg tapes T with spaces in the width direction, the second prepreg tapes T can be laminated in the spaces among the laminated first prepreg tapes T as shown in FIG. 1 using an AFP apparatus which allows disposing a plurality of the prepreg tapes T in the width direction and then feeding out the disposed prepreg tapes T in the length direction. That is, the lamination head of the AFP apparatus to which the compaction roller R is attached is reciprocated relatively to the table and the prepreg tapes T laminated below. Thereby, the lamination is divided into two lamination steps, i.e., the lamination performed in the outward pathway and the lamination performed in the return pathway. As a result, the prepreg tapes T can be laminated without gaps in the width direction. Note that, when the lamination head turns back from the outward pathway to the return pathway, the first prepreg tapes T are cut by a cutter, and the lamination head is reversed.

In this case, any prepreg tape T can be laminated without being in contact with another prepreg tape T in the width direction. Accordingly, it is possible to reliably avoid problems caused by the fact that the prepreg tapes T adjacent in the width direction are integrated with each other by the adhesive force and thereby cannot be fed out at independent feeding speeds.

Figure 2:
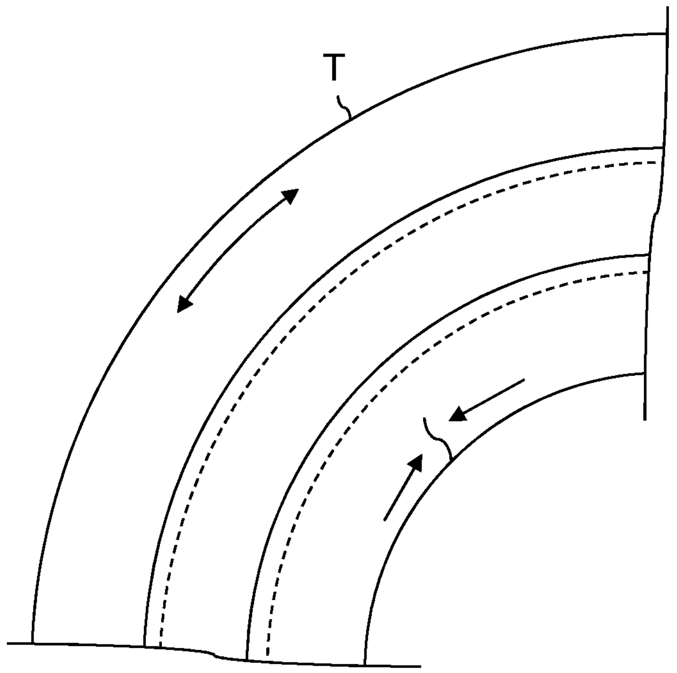
FIG. 2 PRIOR ART
FIG. 2 explains a problem in the conventional method of laminating prepreg tapes.

FIG. 2 explains a problem in the conventional method of laminating prepreg tapes T.

Disposing the prepreg tapes T in the width direction to be fed out in steering lamination in which the prepreg tapes T are laminated along a curved line while changing the feeding direction allows laminating the prepreg tapes T along a curve having a smaller radius of curvature since the prepreg tapes T can be fed out at mutually independent feeding speeds.

Nevertheless, when the prepreg tapes T adjacent to each other in the width direction come into contact with each other as shown in FIG. 2, the prepreg tapes T are integrated with each other due to their adhesive force, which is similar to a case of feeding out one wide prepreg tape T. In this case, wrinkles may arise on the inside of a curve while excessive tension or turning up may arise on the outside of a curve. That is, when the prepreg tapes T adjacent in the width direction come into contact with each other, it becomes difficult to perform steering lamination along a curve having a large curvature.

Accordingly, as shown in FIG. 1, some of the prepreg tapes T to be laminated in a lamination area can be laminated at intervals in the width direction in the outward pathway of the lamination head including the compaction roller R while the others of the prepreg tapes T to be laminated can be laminated at intervals in the width direction in the return pathway of the lamination head. As a result, contact between the prepreg tapes T adjacent in the width direction can be reliably avoided while the prepreg tapes T are being laminated.

When it is necessary to avoid any overlap and any gap between each prepreg tapes T adjacent in the width direction after laminating all the prepreg tapes T in a same ply by the reciprocating the lamination head, what is necessary is to match the intervals of the first prepreg tapes T in the outward path of the lamination head with the widths of the second prepreg tapes T respectively as exemplified in FIG. 1. That is, it is necessary to laminate the first prepreg tapes T at the same interval as the width of one second prepreg tape T.

Conversely, when an overlap or a gap between each prepreg tapes T adjacent in the width direction is permissive after laminating all the prepreg tapes T in a same ply, it is not necessary to match the interval of the first prepreg tapes T with the width of the second prepreg tapes T.

Figure 3:
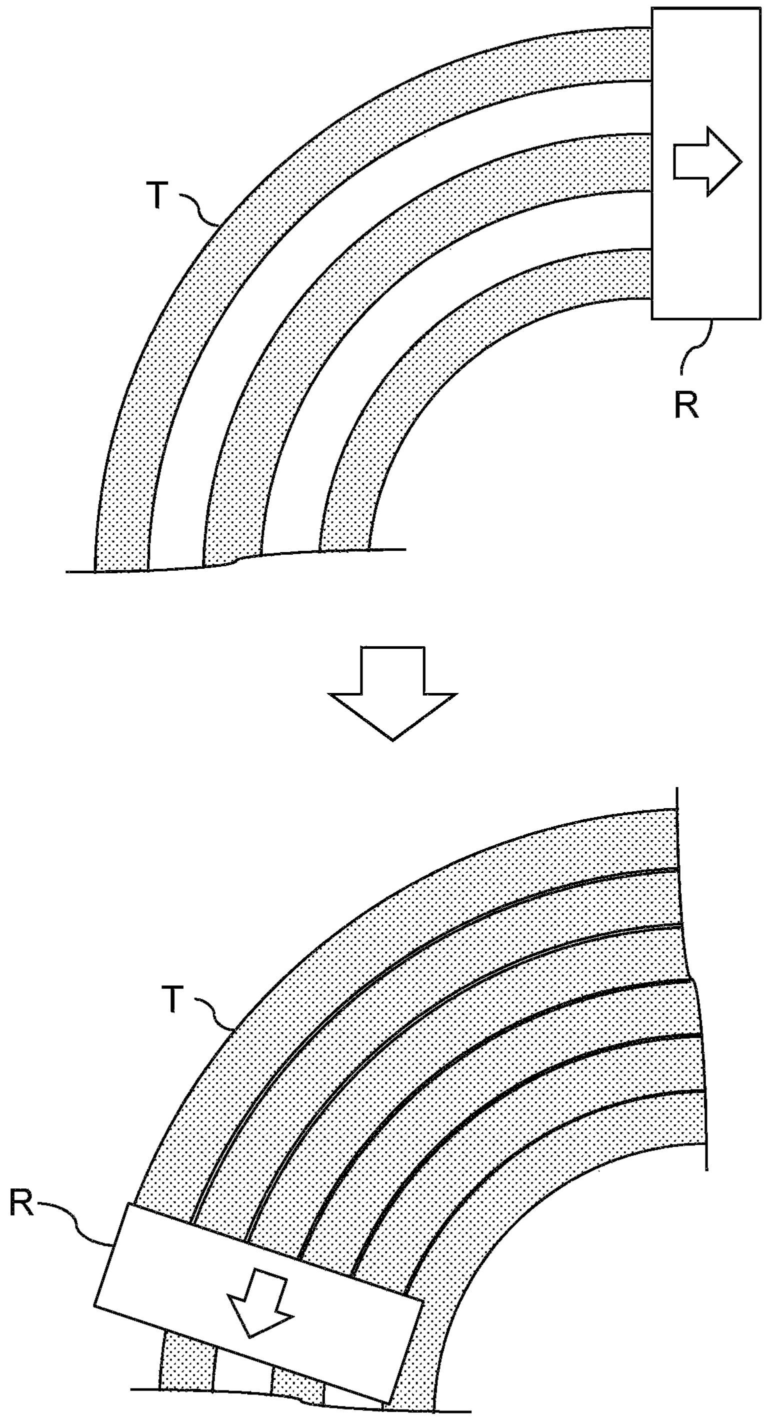
FIG. 3 shows an example of laminating the prepreg tapes along a curved line.

FIG. 3 shows an example of laminating the prepreg tapes T along a curved line.

Avoiding contact between each prepreg tapes T adjacent in the width direction during lamination allows feeding out the prepreg tapes T at mutually independent feeding speeds. Accordingly, it becomes possible to laminate the prepreg tapes T along a curved line having a smaller radius of curvature as exemplified in FIG. 3. Specifically, in order to laminate the prepreg tapes T, the prepreg tapes T to be laminated on the inside of a curve can be fed out at relatively slow feeding speeds while the prepreg tapes T to be laminated on the outside of the curve can be fed out at relatively high feeding speeds. That is, it is possible to perform steering lamination along a curved line having a large curvature.

Figure 4:
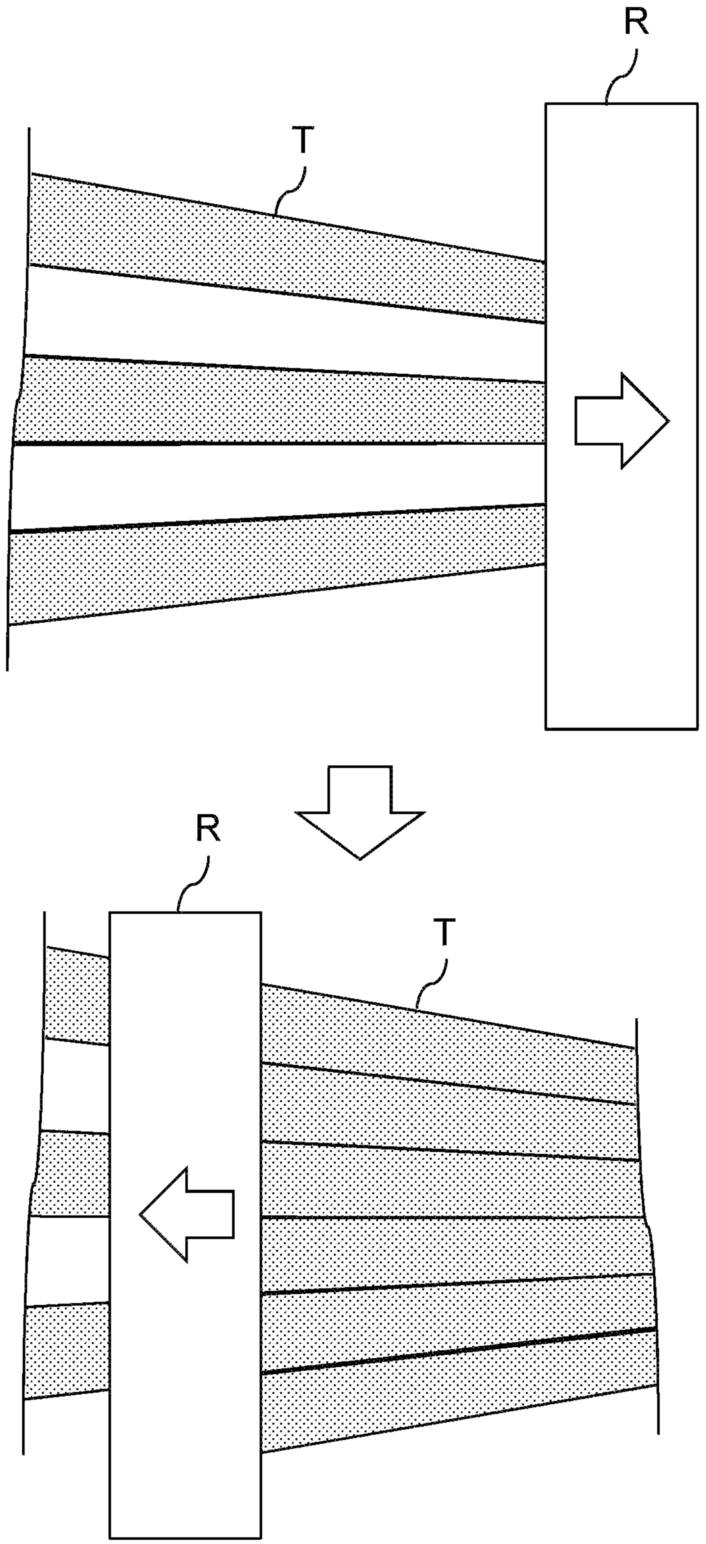
FIG. 4 shows an example of laminating the prepreg tapes while changing the widths of the prepreg tapes.

FIG. 4 shows an example of laminating the prepreg tapes T while changing the widths of the prepreg tapes T.

When the AFP apparatus has a function to change the widths of the prepreg tapes T, the prepreg tapes T can also be laminated while changing the widths as exemplified in FIG. 4. Specifically, the first prepreg tapes T can be laminated with intervals having changing widths while changing the widths of the first prepreg tapes T in the outward path of the lamination head, and subsequently the second prepreg tapes T whose widths change according to the intervals, having the changing widths, of the first prepreg tapes T can be laminated in the intervals, having the changing widths, of the first prepreg tapes T, as shown in FIG. 4.

As a matter of course, when a gap or an overlap in the width direction may be generated between the first prepreg tape T and the second prepreg tape T, the width of each second prepreg tape T does not have to match the interval of the corresponding first prepreg tapes T. Note that, the first prepreg tapes T having variable widths and the second prepreg tapes T having variable widths may also be used for steering lamination along a curve.

Figure 5:
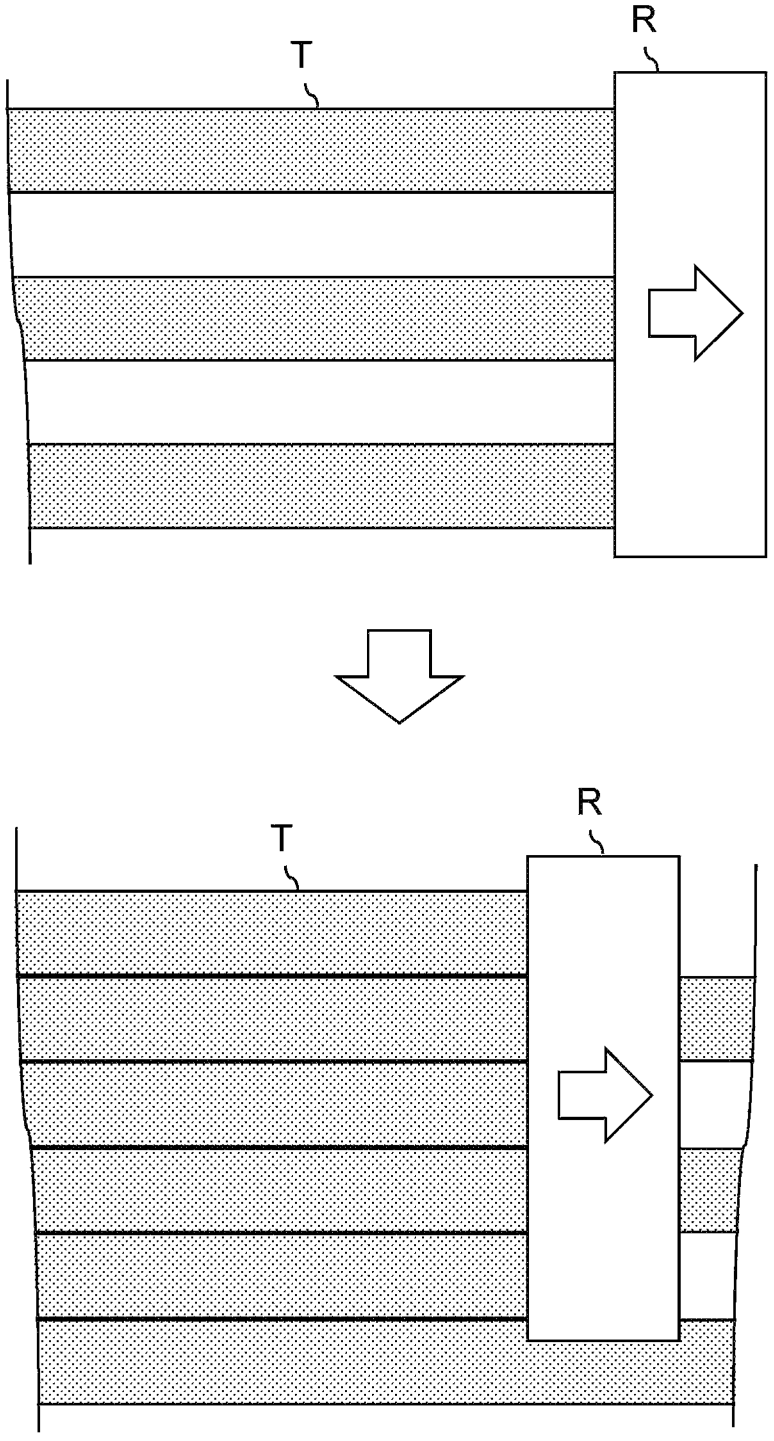
FIG. 5 shows an example of laminating the prepreg tapes twice in a same direction.

FIG. 5 shows an example of laminating the prepreg tapes T twice in a same direction.

Although FIG. 1, FIG. 3 and FIG. 4 each shows an example of laminating the first prepreg tapes T and the second prepreg tapes T by reciprocating the lamination head, the lamination head may be moved in a same direction to laminate the first prepreg tapes T and the second prepreg tapes T as shown in FIG. 5 when the lamination head cannot be reciprocated due to interference of the lamination head or the like. In that case, the path of the lamination head for laminating the second prepreg tapes T shifts in the width direction of the prepreg tapes T from the path of the lamination head for laminating the first prepreg tapes T.

Also when the first prepreg tapes T and the second prepreg tapes T are laminated by moving the lamination head in a same direction, steering lamination along a curved line as shown in FIG. 3 and lamination of the first prepreg tapes T and the second prepreg tapes T with varying widths as shown in FIG. 4 may be performed.

Note that, when the first prepreg tapes T and the second prepreg tapes T having varying widths are laminated by moving the lamination head in a same direction, the widths of the first prepreg tapes T at the lamination end position may differ from the widths of the second prepreg tapes T at the lamination start position. In such a case, it is necessary to move the lamination head to a disposal area of the prepreg tapes T once after laminating the first prepreg tapes T, and then discard the prepreg tapes T until the widths of the prepreg tapes T become target widths of the second prepreg tapes T at the lamination start position. Conversely, in order to avoid discarding the prepreg tapes T, the widths of the second prepreg tapes T at the lamination start position may be matched with the widths of the first prepreg tapes T at the lamination end position.

Next, an example of a configuration of the AFP apparatus for laminating the prepreg tapes T as mentioned above will be described.

Figure 6:
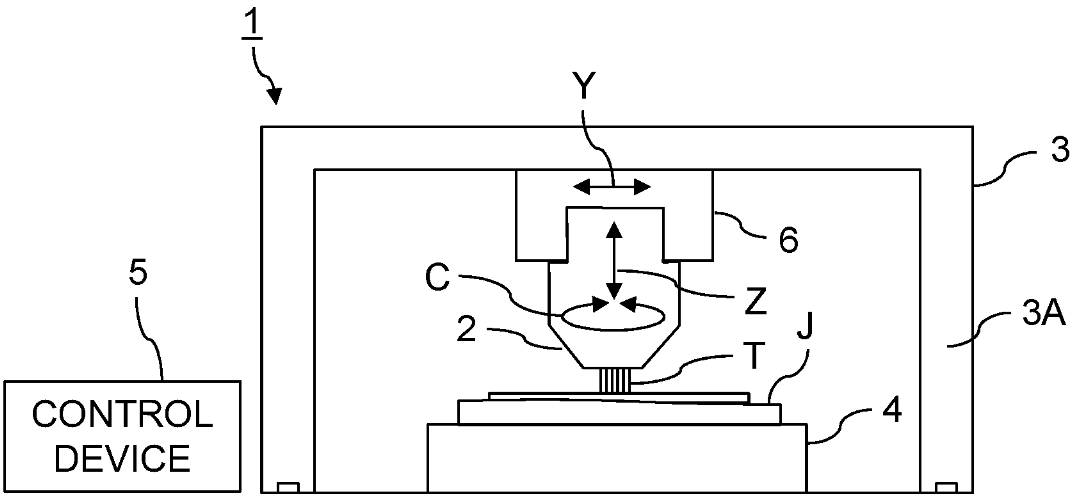
FIG. 6 is a front view showing an example of overall schematic configuration of the AFP apparatus for laminating the prepreg tapes shown in FIGS. 1, 3, 4 and 5.
Figure 7:
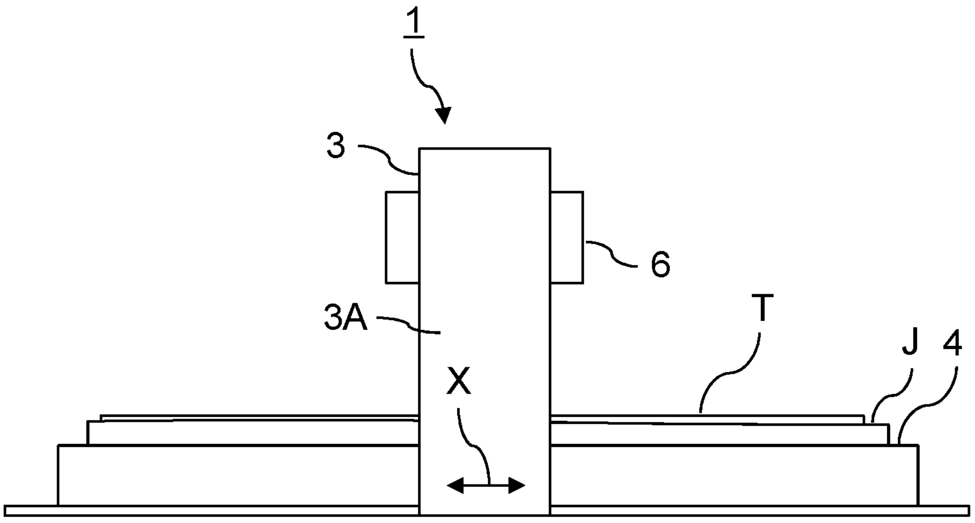
FIG. 7 is a side view of the AFP apparatus shown in FIG. 6.

FIG. 6 is a front view showing an example of overall schematic configuration of the AFP apparatus 1 for laminating the prepreg tapes T shown in FIGS. 1, 3, 4 and 5. FIG. 7 is a side view of the AFP apparatus 1 shown in FIG. 6.

The AFP apparatus 1 produces a laminated body of the prepreg tapes T, which are material of an FRP, by laminating the prepreg tapes T. The prepreg is sheet like fibers impregnated with thermoplastic resin or uncured thermosetting resin.

The AFP apparatus 1 can be composed of a lamination head 2, a gantry 3 suspending the lamination head 2, a table 4, and a control device 5. The lamination head 2 houses the prepreg tapes T inside, and feeds out the prepreg tapes T on the table 4 by discharging the prepreg tapes T. In particular, the lamination head 2 has a function to dispose the prepreg tapes T in parallel while feeding out the prepreg tapes T on the table 4. For that purpose, the lamination head 2 has creel stands of the prepreg tapes T.

The table 4 is a pedestal for laminating the prepreg tapes T. Although the prepreg tapes T may be directly laminated on the table 4, it is practical to place a lamination jig J, such as a shaping mold, on the table 4 so that the prepreg tapes T may be laminated on the lamination jig J, from a viewpoint of shaping a laminated body of the prepregs and cleaning. Therefore, the prepreg tapes T can be laminated on the table 4 directly or indirectly through the lamination jig J.

The gantry 3 includes a feed structure 6 which moves the lamination head 2 in a desired axis direction, besides supporting structures, such as supporting columns 3A, for supporting the lamination head 2. The feed structure 6 makes the lamination head 2 perform a feeding operation. That is, the feed structure 6 moves the lamination head 2 relatively to the table 4 so that the prepreg tapes T can be fed out toward the table 4 side while changing a lamination position. A feeding direction of the prepreg tapes T toward the table 4 side is opposite to a moving direction of the lamination head 2.

The feed structure 6 is configured to rotate the lamination head 2, in addition to typical linear movement of the lamination head 2. Therefore, the prepreg tapes T can be fed out linearly or along a curved line. In other words, a feeding direction of the prepreg tapes T can be changed. Note that, a component attached to the lamination head 2 may be rotated instead of rotating a casing itself of the lamination head 2.

In the example shown in FIG. 6 and FIG. 7, the feed structure 6 has been configured not only to move the lamination head 2 in parallel along three axis directions orthogonal to each other, including horizontal directions and the vertical direction consisting of X-axis, Y-axis and Z-axis, but to rotate the lamination head 2 along a C-axis direction whose rotation axis is the Z-axis in the vertical direction. As a matter of course, at least one tilt axis for inclining the lamination head 2 relative to the surface of the table 4 may be added. Moreover, the table 4 may be moved to the lamination head 2 by the feed structure 6 in addition to the movement of the lamination head 2, or instead of the movement of the lamination head 2.

The moving structure for linearly moving the lamination head 2 and/or the table 4 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement, for example. Alternatively, a moving structure may also be composed of at least one piston and hydraulic circuitry instead of using any motor.

Meanwhile, the rotating structure for rotating the lamination head 2 can be composed of at least one motor, such as an electric motor, a hydraulic motor or a pneumatic motor, and desired machine elements including a rotating shaft which rotates by power of the at least one motor, for example.

The control device 5 automatically controls the feed structure 6 and the lamination head 2. For example, NC (numerical control) of a spatial position and a rotational moving amount of the lamination head 2 relatively to the table 4 can be performed by controlling the feed structure 6. Moreover, the feeding of the prepreg tapes T from the lamination head 2 can be automatically started and ended as well as the prepreg tapes T can be automatically cut, by controlling the lamination head 2. Although the control device 5 may be built in or attached to the gantry 3, user interfaces, such as operation boards, and heavy components may be placed outside the gantry 3.

When NC control of the lamination head 2 is performed by the control device 5, the control device 5 can be composed of electronic circuitry, such as a computer, into which NC program has been read. Moreover, when the feed structure 6 is a hydraulic system or a pneumatic system, a part of the control device 5 can be composed by hydraulic circuitry or pneumatic circuitry.

Figure 8:
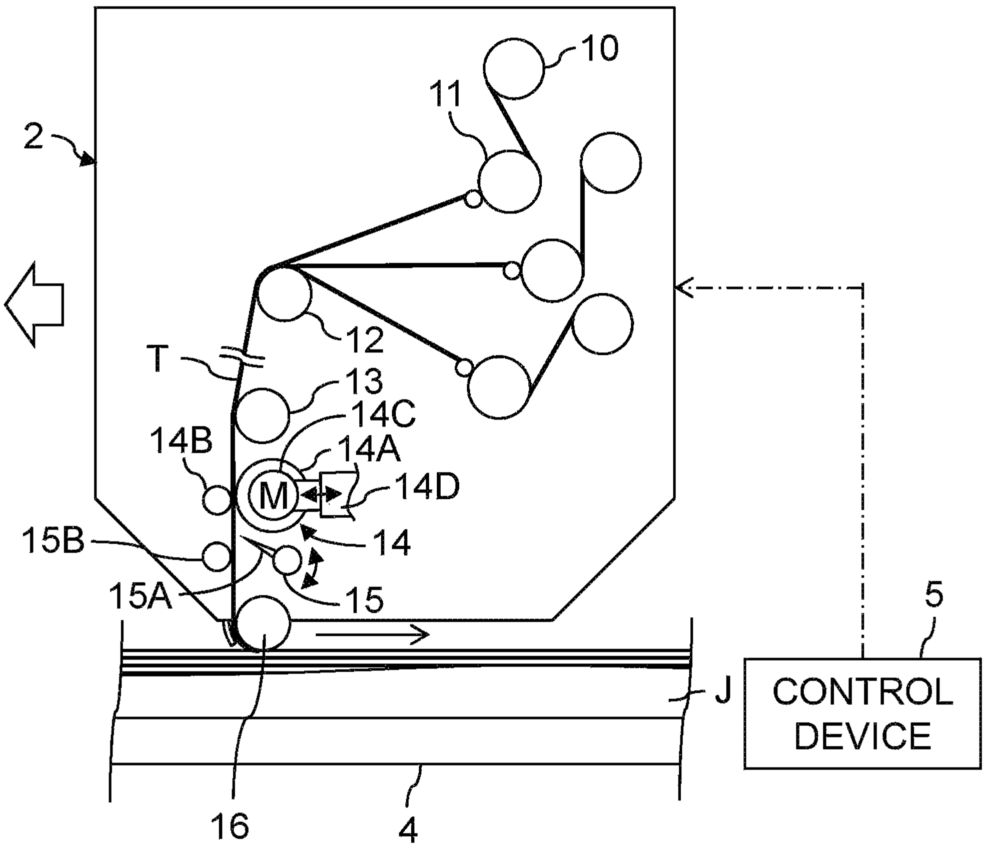
FIG. 8 is a side view showing an example of detailed structure inside and outside the lamination head shown in FIG. 6.

FIG. 8 is a side view showing an example of detailed structure inside and outside the lamination head 2 shown in FIG. 6.

As described above, the lamination head 2 has a function to align the prepreg tapes T in the width direction and feed out the aligned prepreg tapes T onto the table 4. For that purpose, the lamination head 2 can be provided with bobbins 10, width adjusting devices 11, an assembling roller 12, at least one tension roller 13, feed rollers 14, a cutter 15 and a compaction roller 16, as exemplified in FIG. 8.

Each of the bobbins 10 is a creel stand of the prepreg tape T having a constant width, and the prepreg tape T is wound on the bobbin 10. The bobbins 10 are provided as many as the number of the prepreg tapes T that can be fed out onto the table 4. The number of the prepreg tapes T to be fed out onto the table 4 may be decreased by resting or removing a part of the bobbins 10. The widths of the prepreg tapes T may be different from each other between the bobbins 10.

The width adjusting devices 11 are disposed in the rear stages of the bobbins 10 respectively, as required. Each of the width adjusting devices 11 changes the width of the prepreg tape T, supplied from the corresponding bobbin 10, to a desired width. For example, a device for narrowing the width of the prepreg tape T disclosed in Japanese Patent Application Publication JP2020-093454A may be used as the width adjusting device 11. Disposing the width adjusting device 11 makes it possible to supply the prepreg tape T, supplied from the corresponding bobbin 10, with changing the width of the prepreg tape T to a desired width. Conversely, when the width adjusting device 11 is not disposed, the prepreg tapes T having widths different from each other can also be supplied by replacing the bobbin 10 with another bobbin 10 corresponding to a different width of the prepreg tape T.

The width of the prepreg tape T for an aircraft is standardized in units of inches in many cases. It was confirmed by preform prototype tests that it was desirable to make each of the widths of the prepreg tapes T not more than ¼ inch (6.35 mm) from the viewpoint of securing the quality of a preform produced as a laminated body of the prepreg tapes T when steering lamination was performed in which the lamination head 2 was rotated to feed the prepreg tapes T onto the table 4 along a curved line, as described above. Accordingly, the bobbin 10 of the prepreg tape T having a width of ¼ inch or the bobbin 10 of the prepreg tape T having a width of ⅛ inch can be set regardless of whether the width adjusting device 11 is provided.

On the other hand, a standard prepreg tape T on the market has a thickness of 0.2 mm to 0.8 mm. A prepreg tape T having a thickness of 0.05 mm was used for preform prototype tests. Technically, it is considered possible to manufacture a thin prepreg tape T having a thickness of about 0.025 mm.

Each of the bobbin 10 and the width adjusting device 11 is provided with frames or wall surfaces for preventing the prepreg tape T from falling off. Accordingly, the widths of the bobbin 10 and the width adjusting device 11 are each wider than the width of the prepreg tape T. Therefore, in order to dispose the prepreg tapes T side by side without gaps, it is necessary to dispose the units, composed of the bobbins 10 and the width adjusting devices 11, for supplying each adjacent two prepreg tapes T, at different positions in the thickness directions of the prepreg tapes T as shown in FIG. 8 so that the interference between the units, composed of the bobbins 10 and the width adjusting devices 11, for supplying each adjacent two prepreg tapes T can be prevented. When the number of the prepreg tapes T is large, the units each composed of the bobbin 10 and the width adjusting device 11 may be disposed alternately. Alternatively, the prepreg tapes T may be twisted, and the units each composed of the bobbin 10 and the width adjusting device 11 may be disposed at positions where no interference arises.

The assembling roller 12 is a cylindrical roller for disposing and feeding the prepreg tapes T, fed out from positions different in the thickness directions of the prepreg tapes T, at a same position in the thickness directions of the prepreg tapes T. In other words, the assembling roller 12 is a cylindrical roller for arraying the prepreg tapes T, fed out in different directions, so that the length directions of the prepreg tapes T may become almost parallel to each other, and feeding out the arrayed prepreg tapes T in a same feeding direction.

When the width adjusting devices 11 are disposed in the fore stage of the assembling roller 12, the prepreg tapes T having different widths may be fed out to the assembling roller 12. Accordingly, when the interval between the central positions of each two prepreg tapes T adjacent in the width direction is made constant, the width of the gap between the edges of each two prepreg tapes T adjacent in the width direction may change. Therefore, the tape feeders disclosed in the application documents of Japanese Patent Application No. 2022-007499 may be disposed in the fore stage of the assembling roller 12 so that the interval between the central positions of each adjacent two prepreg tapes T can be adjusted according to the widths of the prepreg tapes T fed out from the width adjusting devices 11.

Each tension roller 13 is a cylindrical roller for preventing slack of the prepreg tapes T, fed out in the same direction from the assembling roller 12, by applying tension to the prepreg tapes T. Tension can be applied to the prepreg tapes T by contacting the tension roller 13 with the prepreg tapes T so that the advancing direction of the prepreg tapes T may be changed.

The feed rollers 14 have power for feeding the prepreg tapes T, fed out in a same direction, in the length direction of the prepreg tapes T. The feed rollers 14 can be composed of a cylindrical power roller 14A, which is powered, and a cylindrical support roller 14B, which is not powered. The rotating shaft of the power roller 14A is coupled to the output shaft of a motor 14C. Accordingly, the power roller 14A is rotated by the power of the motor 14C. The support roller 14B is a roller for sandwiching the prepreg tapes T between the support roller 14B and the power roller 14A.

As a matter of course, both of the two rollers that sandwich the prepreg tapes T may be rotated by at least one motor. Gears and/or a one-way clutch may be coupled between the rotating shaft of the power roller 14A and the output shaft of the motor 14C.

The motor 14C for driving the feed rollers 14 can be controlled by the control device 5. Therefore, the start and end of feeding of the prepreg tapes T can be controlled by controlling the start and stop of rotation of the motor 14C.

The cutter 15 is a tool for cutting the prepreg tapes T when the prepreg tapes T fed out in a same direction have been laminated. The operation of the cutter 15 can be controlled by the control device 5.

Although the cutter 15 in the example shown in FIG. 8 is a rotary type in which the cutter 15 is rotated in order to contact a blade 15A of the cutter 15 with the prepreg tapes T, the cutter 15 may be moved in parallel in order to contact the blade 15A of the cutter 15 with the prepreg tapes T. Moreover, a cylindrical roller 15B may be disposed for sandwiching the prepreg tapes T between the roller 15B and the blade 15A of the cutter 15.

The compaction roller 16 is a cylindrical roller for feeding out the prepreg tapes T, fed out in a same direction, toward the table 4 while applying pressure to the prepreg tapes T in the thickness direction of the prepreg tapes T. The prepreg tapes T in the first ply are pressed on the lamination jig J by the compaction roller 16 while the prepreg tapes T in the second and subsequent plies are pressed on the lower laminated prepreg tapes T adjacent in the thickness direction. Therefore, the compaction roller 16 is a roller that feeds out the prepreg tapes T arrayed in the width direction while pressing the arrayed prepreg tapes T to the lamination jig J or the prepreg tapes T adjacent in the thickness direction.

As the number of the laminated prepreg tapes T increases, the height of the prepreg tapes T to be newly laminated gradually increases. Therefore, it is necessary to move the compaction roller 16 also in the vertical direction. The vertical position of the compaction roller 16 can be adjusted by moving the lamination head 2 vertically in parallel with the feed structure 6. Alternatively, a drive shaft may be provided for moving the compaction roller 16 up and down relatively to the lamination head 2.

Moving the compaction roller 16 so that the prepreg tapes T fed out in a same direction may be moved in a horizontal direction relatively to the table 4 allows feeding out the prepreg tapes T in a direction opposite to a moving direction of the compaction roller 16. In order to feed out the prepreg tapes T in a horizontal direction, it is necessary to dispose the compaction roller 16 so that the rotation axis of the compaction roller 16 may be horizontal. On the other hand, other rollers including the assembling roller 12 may each have a rotation axis inclined with respect to the horizontal direction in order to avoid interference or the like since the prepreg tapes T can be twisted.

After the ends of the prepreg tapes T reach the compaction roller 16, the prepreg tapes T can be fed out by the pressure applied from the compaction roller 16 without applying tension to the prepreg tapes T by the powered feed rollers 14. Then, the feeding speeds of the prepreg tapes T necessarily become the speeds of the prepreg tapes T fed out from the compaction roller 16 respectively. Therefore, after the ends of the prepreg tapes T reach the compaction roller 16, it is not preferable to apply excessive tension to the prepreg tapes T by the feed rollers 14 since the excessive tension by the feed rollers 14 causes slack or stretch of the prepreg tapes T.

Thus, the power roller 14A of the feed rollers 14 may be coupled to a cylinder mechanism 14D exemplified in FIG. 8 or another reciprocating mechanical element, such as a rack-and-pinion or a ball screw. Thereby, the power roller 14A can be retracted from the prepreg tapes T after the ends of the prepreg tapes T reach the compaction roller 16. Alternatively, the feed rollers 14 may be brought into contact with the prepreg tapes T in order to secure the tension of each prepreg tape T appropriately. In this case, each prepreg tape T is slid on the feed rollers 14.

Note that, a belt conveyor or a belt conveyor with a suction chuck disclosed in the application documents of Japanese Patent Application No. 2022-013771 may be used instead of the feed rollers 14 or in addition to the feed rollers 14.

Using the above-mentioned AFP apparatus 1 allows arraying the prepreg tapes T supplied from the bobbins 10 in the width direction without gaps, feeding out the arrayed prepreg tapes T in the length direction simultaneously, and applying pressure to the arrayed prepreg tapes T by the common compaction roller 16. In addition, providing the width adjusting devices 11 allows arraying the prepreg tapes T supplied from the bobbins 10 in the width direction and feeding out the arrayed prepreg tapes T in the length direction while changing the widths of the prepreg tapes T.

Accordingly, when the feeding of some of the prepreg tapes T is stopped, the other prepreg tapes T can be fed out at intervals in the width direction. The selected prepreg tapes T can be stopped by controlling necessary elements with the control device 5. For example, each of the bobbins 10 or the width adjusting devices 11 may be provided with a function to stop the feeding of the prepreg tape T while the control device 5 may control the bobbins 10 or the width adjusting devices 11.

Alternatively, a brake for stopping the feeding of the prepreg tape T may be provided for each prepreg tape T while the control device 5 may perform switching control between the ON state and the OFF state of each brake. Note that, the brakes of the prepreg tapes T disclosed in the application documents of Japanese Patent Application No. 2022-013771 may be adopted while the brakes may be controlled by the control device 5.

When the intervals of the prepreg tapes T are the same as the widths of the prepreg tapes T of which the feeding is to be stopped, the feeding of some of the prepreg tapes T can also be stopped manually by an operator without control by the control device 5.

Figure 9:
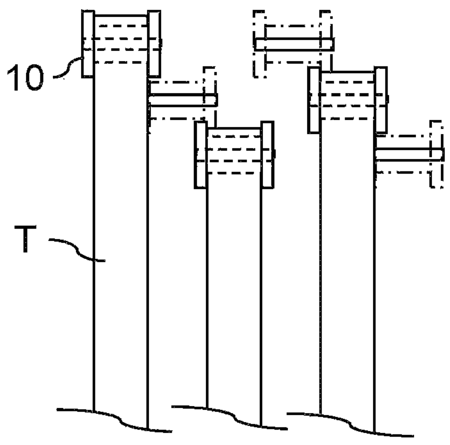
FIG. 9 explains a method of feeding out the prepreg tapes from the lamination head shown in FIG. 8 at intervals without control by the control device.

FIG. 9 explains a method of feeding out the prepreg tapes T from the lamination head 2 shown in FIG. 8 at intervals without control by the control device 5.

As shown in FIG. 9, the first prepreg tapes T and the second prepreg tapes T can be spaced apart from each other by not attaching, to the AFP apparatus 1, a part of the prepreg tapes T to be fed out from the AFP apparatus 1 without gaps. More specifically, the first prepreg tapes T and the second prepreg tapes T can be spaced apart from each other as described above by not attaching, to the AFP apparatus 1, one of the two bobbins 10 for supplying each prepreg tapes T adjacent in the width direction as shown in FIG. 9.

In the example shown in FIG. 9, although the six bobbins 10 can be set to supply the prepreg tapes T having the same width without gaps in the width direction, the three bobbins 10 at discrete positions are not installed, and thereby the prepreg tapes T at intervals in the width direction can be supplied from the three installed bobbins 10. Thus, in case of the AFP apparatus 1 capable of supplying the prepreg tapes T having the same width without gaps in the width direction, the prepreg tapes T can be spaced apart by setting the bobbins 10 of the prepreg tapes T alternately in the width direction.

In this way, when the prepreg tapes T are manually spaced by an operator, creation of a control program to be installed in the control device 5 can be facilitated. Specifically, not only it becomes unnecessary to create control signals for stopping the feeding of the prepreg tapes T and specifying the prepreg tapes T of which the feeding should be stopped, but also the outward path and the return path of the lamination head 2 can be on the same line in case of laminating the first prepreg tapes T and the second prepreg tapes T by reciprocating the lamination head 2.

Figure 10:
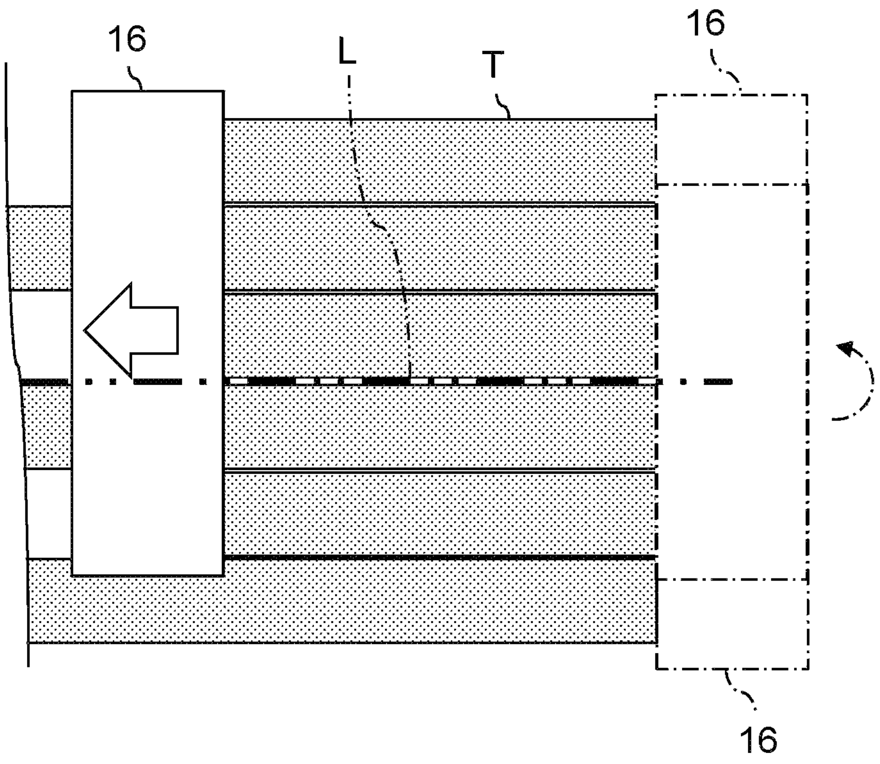
FIG. 10 explains an example of a control program of the lamination head including the compaction roller shown in FIG. 8 for laminating the prepreg tapes as shown in FIG. 1 with the lamination head.

FIG. 10 explains an example of a control program of the lamination head 2 including the compaction roller 16 shown in FIG. 8 for laminating the prepreg tapes T as shown in FIG. 1 with the lamination head 2.

As shown in FIG. 10, the lamination head 2 included in the AFP apparatus 1 can be reciprocated by reversing the lamination head 2. The first prepreg tapes T can be laminated in the outward path of the lamination head 2. On the other hand, the second prepreg tapes T whose number is the same as the number of the first prepreg tapes T can be laminated at the same intervals in the width direction as the intervals of the first prepreg tapes T alternately with the first prepreg tapes T in the return path of the lamination head 2 after the lamination head 2 is reversed.

In this case, the laminated first prepreg tapes T and the laminated second prepreg tapes T are line-symmetrical with respect to the boundary line between the first prepreg tape T and the second prepreg tape T each laminated at the center in the width direction. Therefore, when the boundary line between the first prepreg tape T and the second prepreg tape T laminated at the center in the width direction is defined as a moving path of the lamination head 2, the outward path and the return path of the lamination head 2 can be on the same line L. Accordingly, the line L, for defining a movement path of the lamination head 2, used to create a control program for the lamination head 2 can be shared between the outward path and the return path of the lamination head 2. Therefore, it is possible to easily create a control program to be installed in the control device 5.

When an operator does not attach the bobbins 10 for supplying specific prepreg tapes T to the laminating head 2 in order to stop the feeding of some of the prepreg tapes T, the other prepreg tapes T are fed out from the lamination head 2 at intervals without the control device 5 of the AFP apparatus 1 recognizing that the feeding of some of the prepreg tapes T is stopped. On the other hand, it is also possible to stop the feeding of the desired prepreg tapes T under the control of the control device 5. That is, some of the prepreg tapes T can be selected, and then the feeding of the selected prepreg tapes T can be stopped and started with cutting by the cutter 15 by a control program installed in the control device 5.

In this case, the number of the prepreg tapes T to be fed out can be changed not only between the outward path and the return path of the lamination head 2 but also during the movement of the lamination head 2. Accordingly, the lamination of the spaced apart prepreg tapes T in two steps may be limited to steering lamination where the contact between each prepreg tapes T adjacent in the width direction is not desirable.

Figure 11:
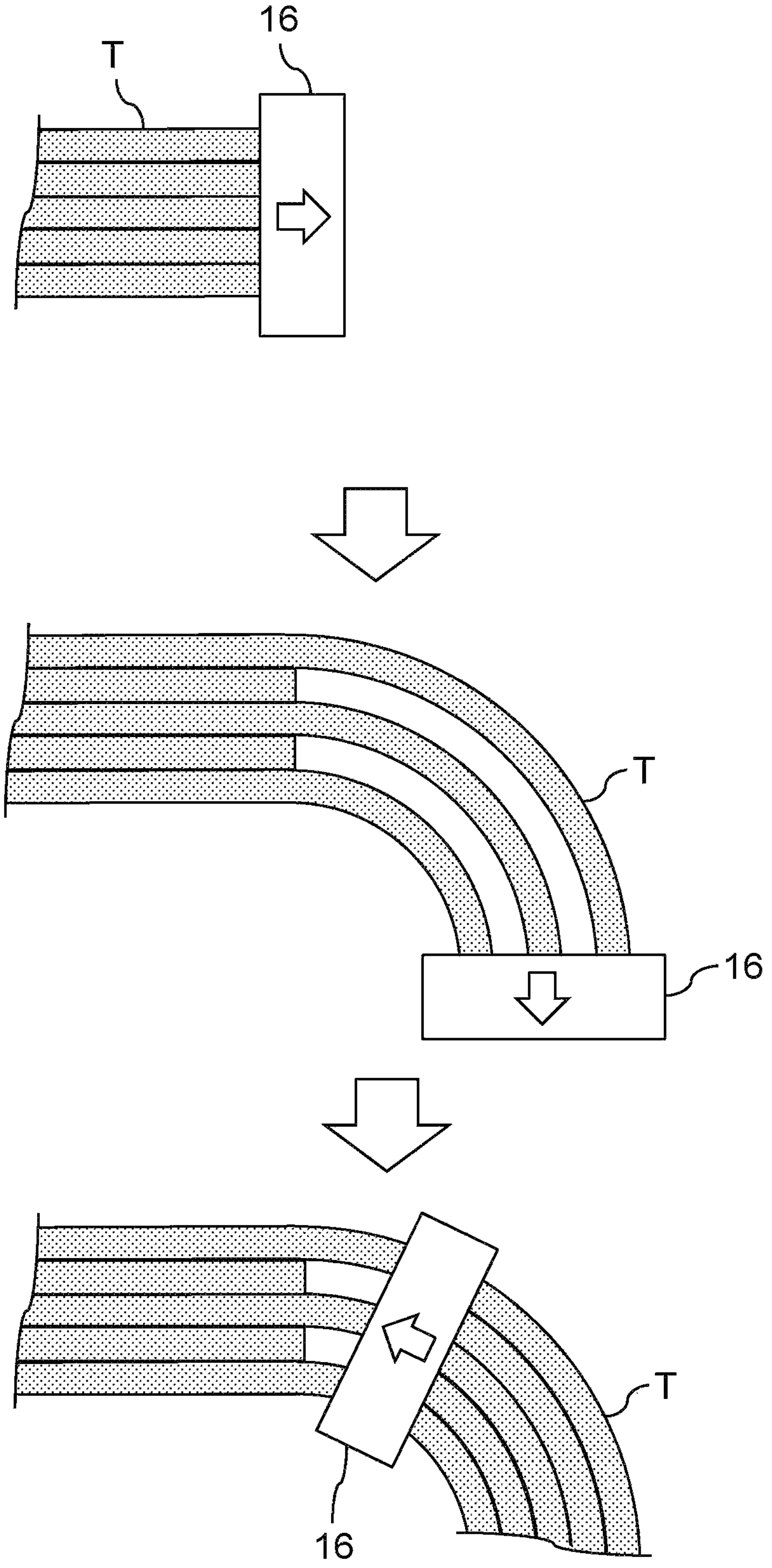
FIG. 11 shows an example of changing the number of the prepreg tapes to be laminated at the same time.

FIG. 11 shows an example of changing the number of the prepreg tapes T to be laminated at the same time.

When the lamination head 2 moves linearly as shown in the upper part of FIG. 11, or when the lamination head 2 moves curvilinearly along a curve whose curvature is less than a threshold value, the prepreg tapes T can be fed out without gaps in the width direction. That is, the prepreg tapes T can be laminated in a same ply by one movement of the lamination head 2 instead of dividing the movement of the lamination head 2 into two movements.

On the other hand, when the lamination head 2 moves curvilinearly along a curve whose curvature is not less than the threshold value as shown in the center of FIG. 11, the first prepreg tapes T can be laminated at intervals by stopping the feeding of some of the prepreg tapes T to be fed without gaps in the width direction. The feeding of some of the prepreg tapes T can be stopped automatically under the control of the control device 5, e.g., by cutting some of the prepreg tapes T by the cutter 15 while stopping the operation of some of the bobbins 10 or some of the width adjusting devices 11, or switching on the brakes for stopping the feeding of some of the prepreg tapes T.

After that, the lamination head 2 can be reciprocated to laminate the second prepreg tapes T in order to fill the intervals of the first prepreg tapes T as shown in the lower part of FIG. 11. When the prepreg tapes T at discrete positions in the width direction are selectively fed out by the control of the control device 5, the number of the prepreg tapes T to be fed out can be changed between the outward path and the return path of the lamination head 2. Therefore, the odd number of the prepreg tapes T can eventually be disposed without gaps.

This is the same when the lamination head 2 is moved linearly as shown in FIG. 1 and when the lamination head 2 is moved in a same direction as shown in FIG. 5. Note that, in the example shown in FIG. 11, the three first prepreg tapes T are laminated at intervals in the outward path of the lamination head 2 for steering lamination along the curve, and then the two second prepreg tapes T are laminated at intervals in the return path of the lamination head 2.

The prepreg tapes T are sequentially laminated layer by layer by movement of the lamination head 2 under the control of the control device 5. When the lamination of the prepreg tapes T in all the plies is completed, a laminated body of the prepreg tapes T is obtained.

When an FRP to be produced has a complicated shape like an aircraft part having a curved web and flange, it may be necessary to give the laminated body of the prepreg tapes T, placed on the lamination jig J, a shape corresponding to the shape of the FRP. In such a case, following the lamination process of the prepreg tapes T, a shaping process is performed to give the shape to the laminated body of the prepreg tapes T.

The laminated body of the prepreg tapes T can be shaped by heating with a heating device and pressurization. The pressurization can be performed by pressing a shaping mold to the laminated body of the prepreg tapes T with a pressing machine or applying atmospheric pressure to the laminated body of the prepreg tapes T by bagging. When the lamination jig J does not serve as a shaping mold, the laminated body of the prepreg tapes T is transferred from the lamination jig J on a shaping mold. Conversely, when the lamination jig J also serves as a shaping mold, the lamination jig J on which the laminated body of the prepreg tapes T is placed is transported to an area for carrying out the shaping process by bagging, a pressing machine, or the like.

When the shaping of the laminated body of the prepreg tapes T is completed, a preform having a shape corresponding to the shape of the FRP after molding is produced. Note that, in a case where the FRP has a simple shape like an aircraft panel, and therefore the preform can be produced only by laminating the prepreg tapes T on the lamination jig J having a shape for the shaping, the lamination and the shaping of the prepreg tapes T are performed at the same time.

(A Method of Molding a Composite Material)

When the FRP is to be molded using the preform produced by the preform producing method described above, the resin included in the preform is cured. That is, a curing process of the resin with which the laminated and shaped prepreg tapes T is previously impregnated is performed. Thereby, the FRP having a target shape can be molded.

When the resin is a thermosetting resin, the curing process of the resin is performed by heating the resin using a heating device, such as an oven or an autoclave apparatus. On the other hand, when the resin is a thermoplastic resin, the curing process of the resin is performed by heating and melting the resin once with a heating device, and then cooling the resin by air cooling or the like. In addition, an assembly process for combining the preform with at least one other preform and/or at least one other intermediately cured FRP as well as placing at least one other dry preform to be molded by the RTM method on the preform, and subsequent injection of resin into the at least one dry preform may also be performed prior to curing the resin.

The lamination jig J or the shaping jig may be used as a molding jig for molding the FRP by curing the resin included in the preform. Alternatively, a molding jig may be prepared separately, and the preform may be transferred from the lamination jig J or the shaping jig to the molding jig.

(Effects)

In the above-mentioned method of producing a preform and the above-mentioned method of molding a composite material, the prepreg tapes T can be arrayed in the width direction and simultaneously laminated at interval, and then gaps, which should be filled, among the prepreg tapes T are filled by subsequent lamination of the prepreg tapes T when such gaps have arisen.

According to the method of producing a preform and the method of molding a composite material, the prepreg tapes T can be arrayed in the width direction and fed out without contacting each other. As a result, the prepreg tapes T arrayed in the width direction can be fed out at independent feeding speeds. Accordingly, steering lamination of the prepreg tapes T along a curve having a large curvature can be facilitated.

In addition, it is possible to lay the prepreg tapes T in a lamination area in a ply without gaps by lamination in two steps of the prepreg tapes T in the lamination area. That is, each prepreg tapes T adjacent in the width direction can be laminated in a lamination area without contacting each other and without generating any gap.

When the widths and the intervals of the prepreg tapes T are intermittently changed, it is possible to change the total width of the prepreg tapes T laminated without gaps in the width direction. As a matter of course, it is also possible to laminate the prepreg tapes T while continuously changing the width of each prepreg tape T itself. Accordingly, variable-width steering lamination of the prepreg tapes T becomes possible.

(Second Implementation)

Figure 12:
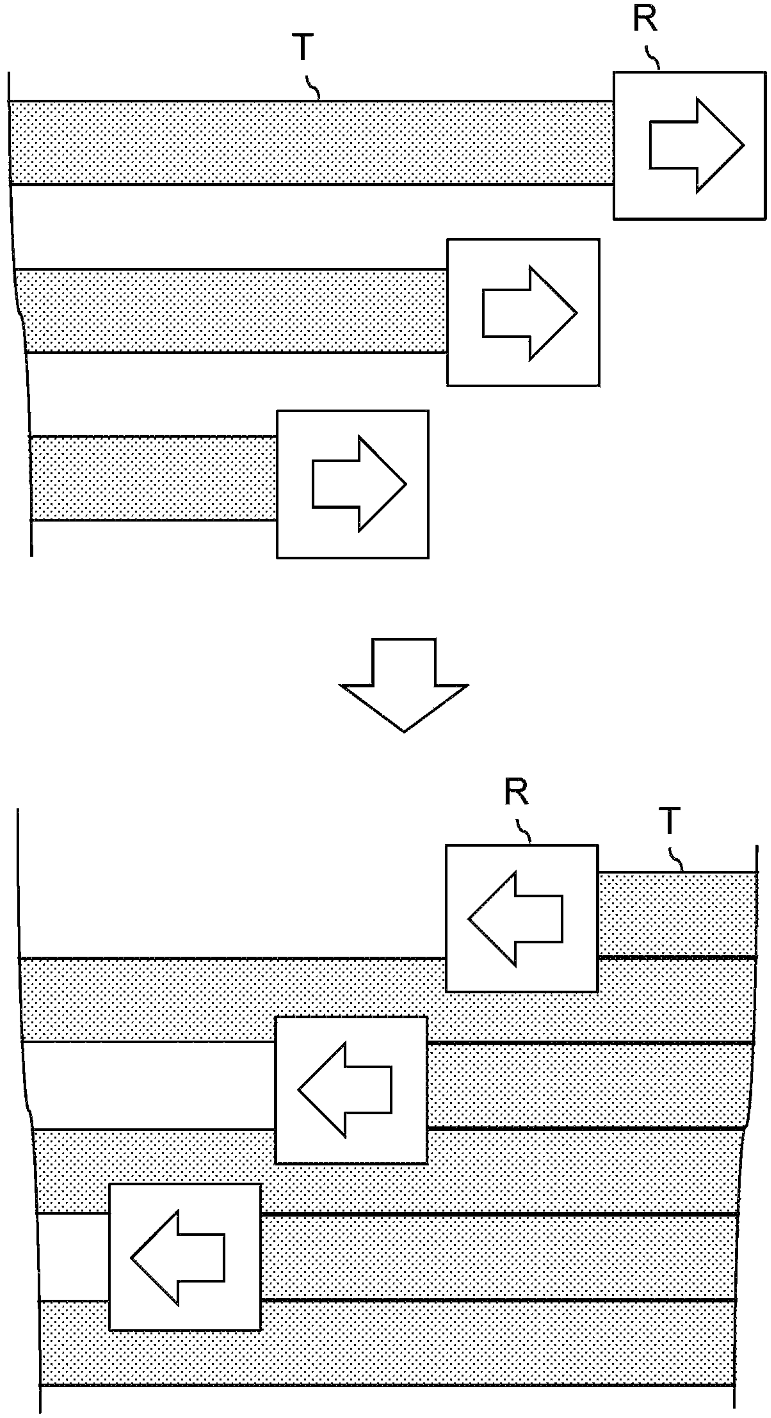
FIG. 12 is a top view of prepreg tapes for explaining a method of producing a preform according to the second implementation of the present invention.

FIG. 12 is a top view of prepreg tapes T for explaining a method of producing a preform according to the second implementation of the present invention.

The method of producing a preform in the second implementation shown in FIG. 12 is different from the method of producing a preform in the first implementation in that different compaction rollers R apply pressure to the prepreg tapes T disposed at intervals in the width direction and simultaneously fed out in the length direction. Other features of the method of producing a preform in the second implementation are not substantially different from those in the first implementation. Therefore, only an example of top view of the prepreg tapes T is shown while explanation of similar features is omitted.

As exemplified in FIG. 12, the different compaction rollers R may apply pressure to the first and second prepreg tapes T each disposed at intervals in the width direction and simultaneously fed out in the length direction. In this case, the prepreg tapes T are simultaneously fed out from positions different not only in the width directions but also in the length directions.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of producing a preform, which is a material for a fiber reinforced plastic, comprising:

laminating a plurality of first prepreg tapes with at least one interval in a width direction of the first prepreg tapes using an automated fiber placement apparatus, having at least one roller and bobbins, configured to allow disposing desired prepreg tapes, supplied from the bobbins, in a width direction of the desired prepreg tapes, and feeding out the disposed desired prepreg tapes, in a length direction of the disposed desired prepreg tapes, using the at least one roller; and laminating at least one second prepreg tape in the at least one interval between the laminated first prepreg tapes, using the automated fiber placement apparatus, and wherein the fiber placement apparatus comprises a lamination head supporting one of said at least one roller, said one of said at least one roller being positioned on the lamination head as a compaction roller for said plurality of first prepreg tapes, which compaction roller contacts and compacts said plurality of first prepreg tapes simultaneously with formation of the at least one interval in the width direction, and wherein the lamination head is configured for adjustment in the width direction such that the compaction roller is shifted widthwise with the lamination head and relative to a central axis line extending along the direction of feed out of said plurality of the first prepreg tapes as to position the at least one second prepreg tape for compaction roller lamination in the at least one interval, wherein the at least one interval of the first prepreg tapes includes first intervals, the second prepreg tapes are laminated at second intervals in a width direction of the second prepreg tapes, the second intervals are same as the first intervals, the second prepreg tapes are laminated alternately with the first prepreg tapes, and wherein said at least one compaction roller for the plurality of the first prepreg tapes also, following the widthwise shifting of said compaction roller, simultaneously compacts the plurality of widthwise spaced apart second prepreg tapes as to fill in the first intervals, and wherein the widthwise shifting of the compaction roller places second prepreg tapes as to be centered within respective intervals formed between the first prepreg tapes and to position at least one second prepreg tape as to extend adjacent an outermost edge of at least one of said first prepreg tapes.

2. The method of producing the preform according to claim 1, wherein the automated fiber placement apparatus is configured to allow disposing the desired prepreg tapes with no gap in the width direction of the desired prepreg tapes, and the at least one interval is formed between the first prepreg tapes by detaching a part of the desired prepreg tapes from the automated fiber placement apparatus, or stopping feeding out the part of the desired prepreg tapes.

3. A method of molding a composite material comprising:

molding the fiber reinforced plastic as the composite material, using the preform produced by the method according to claim 2.

4. The method of producing the preform according to claim 1, wherein a movement path direction of the lamination head, used for creating a control program for the lamination head, is the same during the first prepreg tape lamination and the second prepreg tape lamination.

5. The method of producing the preform according to claim 4, wherein the automated fiber placement apparatus is configured to allow disposing the desired prepreg tapes and feeding out the disposed desired prepreg tapes while changing widths of the desired prepreg tapes, the first prepreg tapes are laminated with the at least one interval having a changing width while changing first widths of the first prepreg tapes, and the at least one second prepreg tape of which second width changes according to the at least one interval having the changing width is laminated in the at least one interval having the changing width.

6. A method of molding a composite material comprising:

molding the fiber reinforced plastic as the composite material, using the preform produced by the method according to claim 1.

7. The method of producing the preform according to claim 1, wherein the automated fiber placement apparatus is configured to allow disposing the desired prepreg tapes and feeding out the disposed desired prepreg tapes while changing widths of the desired prepreg tapes, the first prepreg tapes are laminated with the at least one interval having a changing width while changing first widths of the first prepreg tapes, and the at least one second prepreg tape of which second width changes according to the at least one interval having the changing width is laminated in the at least one interval having the changing width.

8. A method of producing a preform, which is a material for a fiber reinforced plastic, comprising:

laminating a plurality of first prepreg tapes with at least one interval in a width direction of the first prepreg tapes using an automated fiber placement apparatus, having at least one roller and bobbins, configured to allow disposing desired prepreg tapes, supplied from the bobbins, in a width direction of the desired prepreg tapes, and feeding out the disposed desired prepreg tapes, in a length direction of the disposed desired prepreg tapes, using the at least one roller; and laminating at least one second prepreg tape in the at least one interval between the laminated first prepreg tapes, using the automated fiber placement apparatus, and wherein the fiber placement apparatus comprises a lamination head supporting one of said at least one roller, said one of said at least one roller being positioned on the lamination head as a compaction roller for said plurality of first prepreg tapes, which compaction roller contacts and compacts said plurality of first prepreg tapes simultaneously with formation of the at least one interval in the width direction, and wherein the lamination head is configured for adjustment in the width direction such that the compaction roller is shifted widthwise with the lamination head and relative to a central axis line extending along the direction of feed out of said plurality of the first prepreg tapes as to position the at least one second prepreg tape for compaction roller lamination in the at least one interval, and wherein the automated fiber placement apparatus is configured to allow disposing the desired prepreg tapes and feeding out the disposed desired prepreg tapes while changing widths of the desired prepreg tapes, the first prepreg tapes are laminated with the at least one interval having a changing width while changing first widths of the first prepreg tapes, and the at least one second prepreg tape of which second width changes according to the at least one interval having the changing width is laminated in the at least one interval having the changing width.

9. The method of producing the preform according to claim 8, wherein the at least one second prepreg tape includes a plurality of the second prepreg tapes, a first number of the first prepreg tapes is same as a second number of the second prepreg tapes, the at least one interval of the first prepreg tapes includes first intervals, the second prepreg tapes are laminated at second intervals in a width direction of the second prepreg tapes, the second intervals are same as the first intervals, the second prepreg tapes are laminated alternately with the first prepreg tapes, the lamination head is reciprocated by reversing the lamination head, the first prepreg tapes are laminated in an outward path of the lamination head, carrying out the widthwise shifting of the compaction roller and laminating the second prepreg tapes with the reciprocated lamination head, and wherein a movement path direction of the lamination head, used for creating a control program for the lamination head, is the same during the first prepreg tape lamination and the second prepreg tape lamination.

10. A method of molding a composite material comprising:

molding the fiber reinforced plastic as the composite material, using the preform produced by the method according to claim 8.

11. A method of producing a preform, which is a material for a fiber reinforced plastic, comprising:

laminating a plurality of first prepreg tapes with at least one interval in a width direction of the first prepreg tapes using an automated fiber placement apparatus, having at least one roller and bobbins, configured to allow disposing desired prepreg tapes, supplied from the bobbins, in a width direction of the desired prepreg tapes, and feeding out the disposed desired prepreg tapes, in a length direction of the disposed desired prepreg tapes, using the at least one roller; and laminating at least one second prepreg tape in the at least one interval between the laminated first prepreg tapes, using the automated fiber placement apparatus, and wherein the fiber placement apparatus comprises a lamination head supporting one of said at least one roller, said one of said at least one roller being positioned on the lamination head as a compaction roller for said plurality of first prepreg tapes, which compaction roller contacts and compacts said plurality of first prepreg tapes simultaneously with formation of the at least one interval in the width direction, and wherein the lamination head is configured for adjustment in the width direction such that the compaction roller is shifted widthwise with the lamination head and relative to a central axis line extending along the direction of feed out of said plurality of the first prepreg tapes as to position the at least one second prepreg tape for compaction roller lamination in the at least one interval, wherein the plurality of first prepreg tapes, with at least one interval in a width direction, are laminated without mutual contact and fed out at mutually independent and different feeding speeds along a curve, and wherein the feeding speeds include a first feeding speed for feeding a prepreg tape, out of the plurality of the first prepreg tapes, to be laminated on an inside of the curve, and a second feeding speed, which is higher than the first feeding speed, for feeding another prepreg tape, out of the plurality of the first prepreg tapes, to be laminated on an outside of the curve.

12. A method of molding a composite material comprising:

molding the fiber reinforced plastic as the composite material, using the preform produced by the method according to claim 11.

13. The method of producing the preform according to claim 11, wherein the at least one interval of the first prepreg tapes includes first intervals, the second prepreg tapes are laminated at second intervals in a width direction of the second prepreg tapes, the second intervals are same as the first intervals, the second prepreg tapes are laminated alternately with the first prepreg tapes, and wherein said at least one compaction roller for the plurality of the first prepreg tapes also, following the widthwise shifting of said compaction roller, simultaneously compacts the plurality of widthwise spaced apart second prepreg tapes as to fill in the first intervals.

14. A method of molding a composite material comprising:

molding the fiber reinforced plastic as the composite material, using the preform produced by the method according to claim 13.

15. The method of producing the preform according to claim 13, wherein the widthwise shifting of the compaction roller places second prepreg tapes as to be centered within respective intervals formed between the first prepreg tapes and to position at least one second prepreg tape as to extend adjacent an outermost edge of at least one of said first prepreg tapes.

16. The method of producing the preform according to claim 13, wherein the first prepreg tapes are laminated in an outward path of the lamination head, the lamination head is then reciprocated by reversing the lamination head and run in a direction opposite to the outward path and without prepreg tape application, the lamination head is then again reversed and the second prepreg tapes are fed out, in a common direction of feed as the outward path, as to fill in the first intervals.

17. A method of producing a preform, which is a material for a fiber reinforced plastic, comprising:

laminating a plurality of first prepreg tapes with at least one interval in a width direction of the first prepreg tapes using an automated fiber placement apparatus, having at least one roller and bobbins, configured to allow disposing desired prepreg tapes, supplied from the bobbins, in a width direction of the desired prepreg tapes, and feeding out the disposed desired prepreg tapes, in a length direction of the disposed desired prepreg tapes, using the at least one roller; and laminating at least one second prepreg tape in the at least one interval between the laminated first prepreg tapes, using the automated fiber placement apparatus, and wherein the fiber placement apparatus comprises a lamination head supporting one of said at least one roller, said one of said at least one roller being positioned on the lamination head as a compaction roller for said plurality of first prepreg tapes, which compaction roller contacts and compacts said plurality of first prepreg tapes simultaneously with formation of the at least one interval in the width direction, and wherein the lamination head is configured for adjustment in the width direction such that the compaction roller is shifted widthwise with the lamination head and relative to a central axis line extending along the direction of feed out of said plurality of the first prepreg tapes as to position the at least one second prepreg tape for compaction roller lamination in the at least one interval, and wherein the laminating head feeds a plurality of straight-line path tapes inclusive of the first prepreg tapes along a straight-line path, and wherein the at least one interval between the first prepreg tapes is initiated upon reaching a border between the straight-line path and a curved portion of a predefined feed path for the first prepreg tapes, and wherein the at least one interval extends along the curved portion of the predefined feed path for the first prepreg tapes.

18. The method of claim 17, wherein the second prepreg tape or tapes fill in the interval or intervals formed along the curved portion of the predefined feed path, and the second prepreg tape or tapes are fed following lamination head reversal and continued without interruption until the second prepreg tape or tapes reach the border, and wherein the number of first prepreg tapes exceeds the number of second prepreg tapes.

19. A method of molding a composite material comprising:

molding the fiber reinforced plastic as the composite material, using the preform produced by the method according to claim 18.

20. A method of molding a composite material comprising:

molding the fiber reinforced plastic as the composite material, using the preform produced by the method according to claim 17.

* * * * *